United States Patent [19]

Capriotti et al.

[11] Patent Number: 4,865,874
[45] Date of Patent: Sep. 12, 1989

[54] APPARATUS AND PROCESS FOR THE MANUFACTURING OF SHEETS OF SAFETY GLASS WITH A SUPERFICIAL COATING OF PLASTIC MATERIAL

[75] Inventors: Luigi Capriotti, Porto D'Ascoli AP; Massimo Puccinelli, Vasto CH, both of Italy

[73] Assignee: Società Italiana Vetro - SIV S.p.A., San Salvo, Italy

[21] Appl. No.: 165,491

[22] Filed: Mar. 8, 1988

[30] Foreign Application Priority Data

Mar. 31, 1987 [IT] Italy ................................. 47793 A/87

[51] Int. Cl.⁴ .......................... B05D 3/06; B05D 5/12; B05C 11/02
[52] U.S. Cl. ..................................... 427/54.1; 118/52; 118/300; 118/500; 118/643; 118/697; 118/698; 427/55; 427/240; 427/421

[58] Field of Search ...................... 427/240, 421, 54.1, 427/55; 118/697, 698, 643, 52, 300, 500

[56] References Cited

U.S. PATENT DOCUMENTS 2,455,257 11/1948 Kohler et al. .......................... 118/52
4,357,900 11/1982 Bushor ................................. 118/697
4,751,145 6/1988 Sebastiano ........................... 427/240

*Primary Examiner*—Janyce Bell
*Attorney, Agent, or Firm*—Wenderoth, Lind & Ponack

[57] ABSTRACT

An apparatus for the manufacture, on a commercial scale, of safety glass sheets for motor cars and/or buildings, having a superficial coating of plastic material, includes an automatically activated and self-propelled carriage for facilitating the spraying, centrifugation and irradiation of the plastic coating on the glass. The carriage follows a closed loop path to be able to effect the operations a number of times for obtaining a desired thickness of the coating.

2 Claims, 3 Drawing Sheets

APPARATUS AND PROCESS FOR THE MANUFACTURING OF SHEETS OF SAFETY GLASS WITH A SUPERFICIAL COATING OF PLASTIC MATERIAL

BACKGROUND OF THE INVENTION

1. Field of the Invention

The present invention relates to a method and apparatus for manufacturing a sheet of safety glass, for use in motor cars or buildings, provided with a coating of plastic material for improving the safety characteristics exhibited thereby when breaking.

2. Description of the Prior Art

Sheets of safety glass known in the prior art typically comprise a glass substrate and a coating of plastic material applied on one of the two surfaces of the substrate.

When such safety glass is used as a motor car windshield, the plastic coating serves to avoid injuries to the passengers caused by sharp fragments normally produced when the glass breaks. Moreover, the plastic coating should also have particular mechanical and optical properties, such as properties of non-tearing, self-healing, resistance to abrasion and to aging, in order to meet International Standards, such as DIN, ECE, ASA standards and the like.

Compositions of and methods for producing a coating of plastic material to be applied on a glass substrate are known in the prior art.

Typically, Italian published application No. 19459A/86 describes a composition based upon polycaprolactones, acryl monomers, aliphatic polyisocyanates, flowing agents, reaction catalysts and the like selected and mixed in such a way as to form a plastic coating with the desired optical and mechanical features and able to provide the glass substrate with the required safety characteristics. A composition of this type is sprayed in a liquid state with a viscosity of 40 to 200 centipois on a glass substrate which, when such is to be used in motor cars, has been previously cut and curved to the desired configuration.

Immediately after spraying, the glass substrate is rotated horizontally at a speed of 10 to 50 rpm, so as to facilitate a levelling of the liquid film in which a uniform thickness of the film is maintained over the entire surface of the substrate.

The polymerization of the sprayed liquid takes place directly on the substrate to which the coating intimately adheres and successive infrared and ultraviolet irradiation treatments help complete the polymerization.

In a single spraying operation, it is advisable to lay a film having a thickness of 80 to 150 microns. Further, spraying and polymerization operations can be carried out to provide a coating thickness that is sufficient to provide the glass with the desired safety characteristics.

In the manufacture, on a commercial scale, of safety sheets of glass provided with a plastic coating having high optical and mechanical quality, typically resulting in a composition obtained by a process as previously described, a problem of ensuring a sufficient centrifugal force to the liquid layer during the treatment thereof by infrared and ultraviolet irradiation arises and, moreover, it is necessary to repeat the coating and polymerization process a number of times until the desired thickness is obtained without affecting the production time.

SUMMARY OF THE INVENTION

It is an object of the present invention to provide an improvement in a plant for applying a coating of plastic material, the plant including a plurality of machines for effecting spraying and irradiation operations in series to manufacture sheets of safety glass of the type having said coating applied on one of its two opposed surfaces by said spraying and irradiation operations, and the improvement comprising: a closed loop track along which a sheet charging station, a spraying station, infrared and ultraviolet irradiation stations and a sheet discharging station are positioned in a successive relationship; a self-propelling carriage running along said track; a power supply borne on said carriage; a control processor unit for programming and controlling said operations and borne on said carriage and powered by said power supply; an electric motor for driving said carriage borne on said carriage, powered by said power supply and controlled by said processor unit; a rotary shaft vertically mounted on said carriage in an operative driving connection with said electric motor; a frame fixed horizontally on top of said shaft for receiving, at said charging station, said sheet of glass to be subjected to said operations; suction cups fixed to said frame for retaining said sheet; said processor unit being programmed to provide control instructions for cyclically subjecting said sheet of glass to said spraying and irradiation operations a number of times sufficient to obtain a coating having a desired thickness on said sheet and simultaneously rotating said sheet for centrifuging said coating after said spraying operation and during said irradiation operations.

It is a further object of the present invention to provide improvement in a process for the application of a coating of plastic material including spraying and irradiation operations to manufacture a sheet of safety glass of the type having said coating applied on one of its two opposed surfaces by said spraying and irradiation operations, the improvement comprising: positioning said sheet of glass on a self-propelling carriage provided with an electric motor and a control processor unit for controlling and programming said operations; carrying said sheet of glass along a closed loop path for subjecting it successively to spraying, infrared irradiation and ultraviolet irradiation operations and rotating said sheet horizontally for centrifuging said coating during the irradiation operations; and cyclically repeating said steps a number of times that are sufficient to obtain a coating having a desired thickness on said sheet.

The advantages obtained with the present invention consist in that it is possible to provide a carousel of carriages, each carriage being able to centrifugate the coating on the sheet of glass during its travel, capable of obtaining different thicknesses of the coating for each sheet depending on the individual requirements, and thus making the plant fit to respond to the requirements of furnishing different types of the final product without effecting the production times.

It is to be understood, however, that while the apparatus and method according to the present invention are particularly referred to as being used to produce a coating obtained from the compositions described in the Italian published patent application No. 19459A/86, the same apparatus can be advantageously used for manufacturing, on a commercial scale, sheets of safety glass with a plastic coating formed from other types of compositions.

Moreover the glass substrate can be a sheet of laminated glass, tempered or half-tempered glass, or curved or flat monolithic glass.

BRIEF DESCRIPTION OF THE DRAWINGS

The present invention will be better understood with reference to the accompanying drawings in which, for an illustrative and not a limitative purpose, the manufacture of curved safety glass for motor cars is illustrated.

DETAILED DESCRIPTION OF THE PREFERRED EMBODIMENT

Figure 1:
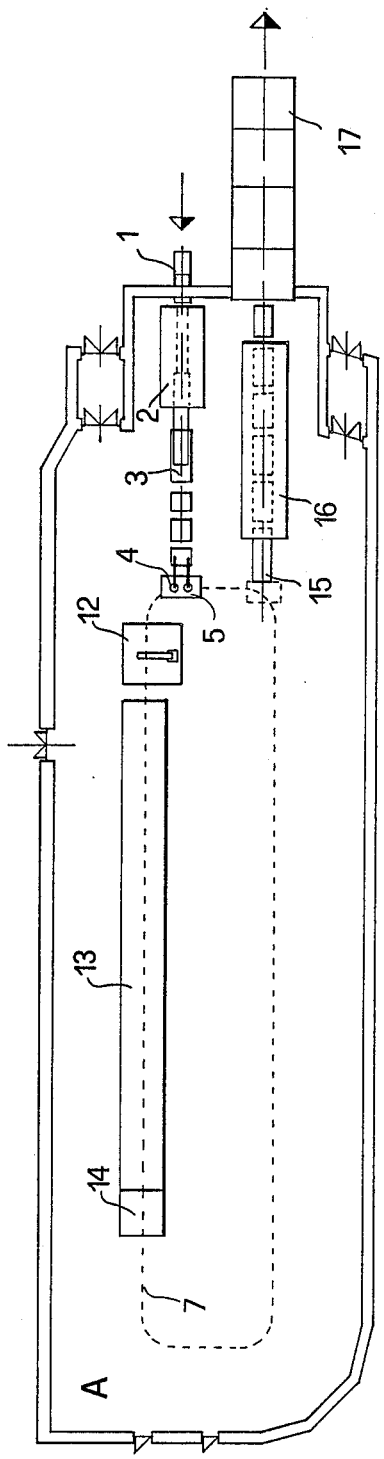
FIG. 1 is a general and schematic view of the apparatus for the manufacture of safety glass sheets according to the present invention.
Figure 2:
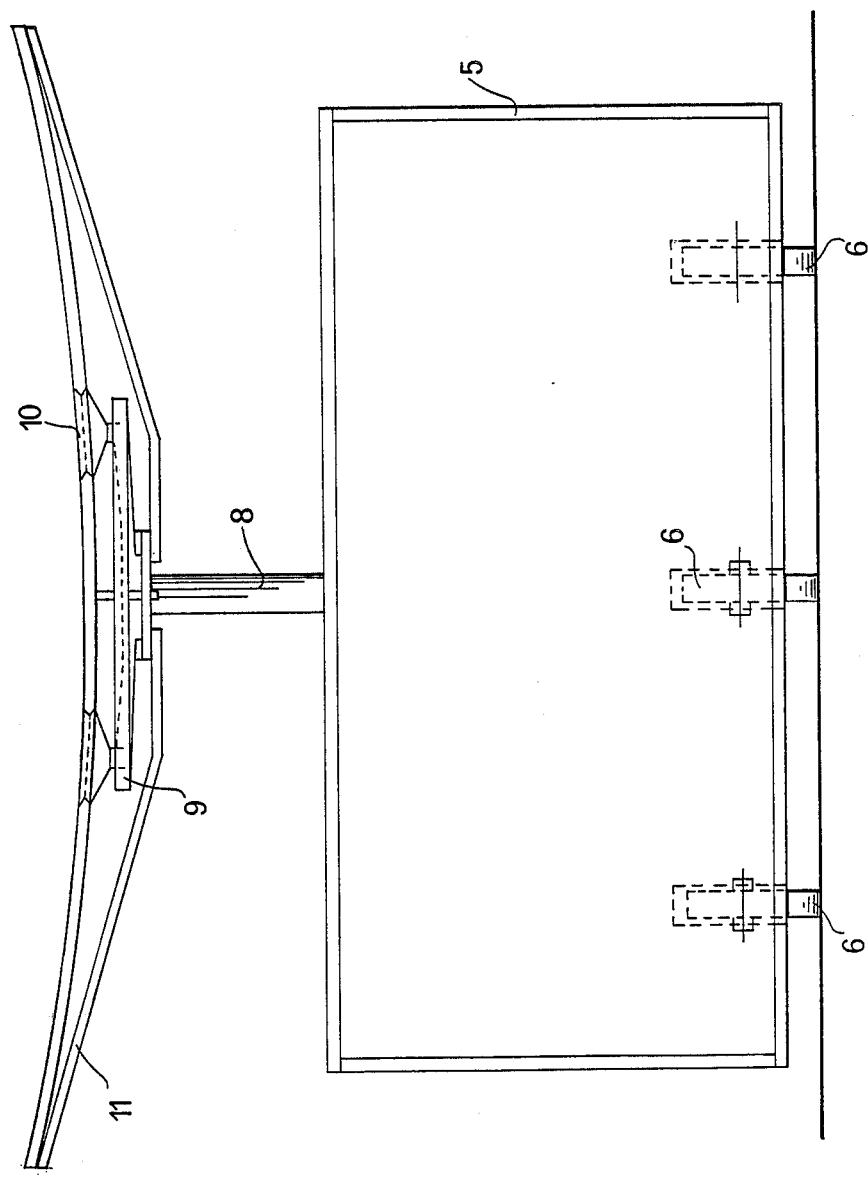
FIG. 2 is a side view of the automatic and self-propelled carriage of the present invention.
Figure 3:
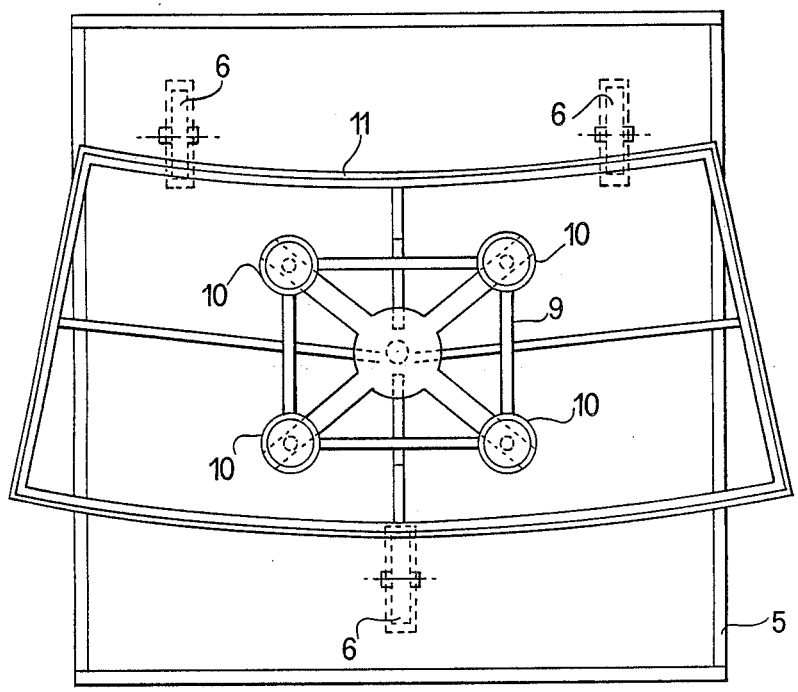
FIG. 3 is a plan view of the carriage of FIG. 2.

Referring to FIGS. 1 to 3, a plant for the manufacture of sheets of safety glass according to the invention comprises a horizontal conveyor 1, a machine 2 for washing and drying the sheets of glass, horizontal conveyor belts 3, a machine 4 for charging the sheets of glass and a carriage 5, receiving said glass.

Additionally, the plant comprises a spraying device 12, a tunnel oven 13 for facilitating infrared irradiation of the glass sheets, a tunnel oven 14 for facilitating ultraviolet irradiation, a machine 15 for discharging the coating sheets of glass from the carriage, a tunnel oven 16 for infrared irradiation and a successive hot air tunnel oven 17 for completing the polymerization reaction.

A sheet of glass previously cut and curved, is charged on the conveyor table 1 and introduced into a room A, which is carefully insulated from the outside and is dust-free. The sheet is washed and dried by the device 2 and then transferred by means of the conveyors 3 and the machine 4 to the carriage 5. The carriage 5 is powered by means of a bank of batteries mounted directly on board, so as to be completely independent from the rest of the manufacturing line. An electric motor, also mounted on board the carriage, causes the carriage to travel by powering metal wheels 6 rolling on a closed ring metal track secured to the floor, the path of which is indicated by reference numeral 7.

In order to control the operation sequence, a control processor unit provided with a programmable unit for the control of the production cycle is mounted on carriage 5.

The carriage 5 is capable of carrying out the following operations in a self-sufficient manner: travelling along the track 7, centrifugation of the sheet of glass, production of a vacuum to enable the sheet to be fixed thereto, speed regulation and control in relation to the operation being carried out.

The carriage 5 is provided with a mechanical system for the centrifugation of the sheet of glass. In fact, the sheet is positioned on a frame 9 provided with suction cups 10 and is horizontally rotated by a rotating shaft 8 having a vertical axis. The angular speed of the shaft can be controlled in a continuous manner to rotate at about 200 rpm. On the same rotating shaft 8, a frame 11 is fixed having the same configuration as the sheet to be coated and on which the sheet is positioned. The frame 11, by means of its outer rim, serves the purpose of preventing the liquid laid on the concave curved area of the sheet from dropping beyond the edge of the sheet, and wetting the underlying surface. Once centered on the carriage 5, the sheet of glass is fixed to the frame 11 by means of the suction cups 10.

The carriage 5 begins to travel and, by following the path of the track 7, moves to the spraying station 12 where it stops and an amount of liquid is sprayed to obtain a coating having a thickness of 80 to 150 microns.

As soon as the spraying is completed, the shaft 8 starts to rotate at an angular speed of 10 to 50 rpm.

At the same time, the carriage 5 again begins to travel and passes through the tunnel 13 where it is subjected to infrared irradiation for 5 to 10 minutes. Subsequently, the carriage 5 passes through the tunnel 14 where it is subjected to ultra-violet irradiation for 2 to 10 seconds. Upon the completion of the ultraviolet irradiation treatment, the movement of the shaft 8 is stopped.

The carriage 5 travels along the remaining portion of the track 7 reaching a discharge station at which a machine 15 takes the sheet from the carriage 5 and delivers it to a first tunnel oven 16 for a final infrared irradiation treatment and to a second tunnel 17 for a final hot air drying treatment.

Whenever it is desired to increase the thickness of the polymerized solid coating, the carriage 5 continues around track 7 to have the spraying operation and the infrared and ultraviolet irradiation operations are repeated the number of times necessary to obtain the desired thickness.

Whereas the invention has been described in a preferred embodiment, variations and modifications may be made thereto, all falling within the scope of the invention.

What is claimed:

1. An apparatus for manufacturing a sheet of safety glass having a coating disposed on one surface thereof, said apparatus comprising:
   a closed loop track;
   a spraying station for spraying a liquid coating on one surface of the sheet of glass, infrared and ultraviolet irradiation stations for respectively irradiating the sprayed coating, and a sheet discharge station disposed successively at respective locations along said closed loop track;
   a self-propelled carriage engaging said track for being guided thereby to said stations,
   a power supply carried by said carriage;
   an electric motor carried by said carriage and operatively connected to said power supply for driving said carriage along said track;
   a vertically extending rotary shaft rotatably mounted to the carriage and operatively connected to said electric motor for being driven thereby to rotate;
   a horizontally extending frame for supporting the sheet of glass, said frame mounted to said rotary shaft for rotating therewith;
   suction cups fixed to said frame for generating suction to releasably retain the glass sheet on said frame; and
   a control processor unit carried by said carriage and operatively connected to said power supply source and said electric motor so as to be powered by the power supply source and so as to control the operation of said electric motor,
   said processor unit being programmed for providing control instructions to said electric motor to drive said carriage along said closed loop track and past said spraying and said irradiation stations a predetermined number of times that will provide a coating having a desired thickness on the sheet of glass and to rotate said rotary shaft after said carriage has passed said spraying station and while said carriage is at said irradiation stations to centrifuge the liquid coating sprayed on the glass sheet at said spraying station during the irradiation thereof.

2. In a method of applying a coating of plastic material to a glass sheet by spraying one surface of the glass sheet with a liquid coating of the plastic material and subsequently irradiating the same to form a sheet of safety glass, the improvement comprising:

providing a spraying station for spraying the glass sheet with the liquid coating, and infrared and ultraviolet irradiation stations for irradiating the sprayed glass sheet, in successive respective locations around a closed loop path;

positioning the sheet of glass horizontally on a self-propelled carriage having an electric motor for driving the carriage along said path, rotary means for rotating the positioned sheet, and a control processor unit operatively connected to the electric motor and the rotary means; and programming said control processor unit to control the electric motor to cyclically drive the carriage along said path past said stations a predetermined number of times that are sufficient to provide a coating having a desired thickness on the sheet of glass and to rotate the rotary means after said carriage has passed the spraying station and while the carriage is at the irradiation stations to centrifuge the coating sprayed on the glass sheet.

* * * * *